(12) United States Patent
McPherson et al.

(10) Patent No.: US 7,454,257 B2
(45) Date of Patent: Nov. 18, 2008

(54) APPARATUS AND METHOD FOR DOWN CONVERTING MULTICHANNEL PROGRAMS TO DUAL CHANNEL PROGRAMS USING A SMART COEFFICIENT GENERATOR

(75) Inventors: Alan J. McPherson, Chatsworth, CA (US); George H. Lydecker, Burbank, CA (US)

(73) Assignee: Warner Music Group, New York, NY (US)

( * ) Notice: Subject to any disclaimer, the term of this patent is extended or adjusted under 35 U.S.C. 154(b) by 1826 days.

(21) Appl. No.: 09/779,271

(22) Filed: Feb. 8, 2001

(65) Prior Publication Data

US 2002/0106088 A1    Aug. 8, 2002

(51) Int. Cl.
*G06F 17/00* (2006.01)
*H04B 1/00* (2006.01)
(52) U.S. Cl. ............................ 700/94; 381/119; 369/4
(58) Field of Classification Search ................ 381/119, 381/17–19, 22, 23; 369/47.15, 47.21, 47.22, 369/4, 47.16; 700/94
See application file for complete search history.

(56) References Cited

U.S. PATENT DOCUMENTS

| | | | |
|---|---|---|---|
| 3,864,516 A | 2/1975 | Kameoka et al. | |
| 5,291,557 A | 3/1994 | Davis et al. | |
| 5,638,451 A * | 6/1997 | Sedlmeyer | 381/2 |
| 5,917,781 A * | 6/1999 | Kim | 369/4 |
| 6,005,948 A * | 12/1999 | Maeda | 381/18 |
| 6,154,545 A | 11/2000 | Kohut et al. | |
| 6,252,965 B1 | 6/2001 | Beard | |
| 6,466,833 B1 * | 10/2002 | Lau | 700/94 |
| 6,870,936 B1 * | 3/2005 | Ajamian | 381/119 |
| 2004/0032960 A1 * | 2/2004 | Griesinger | 381/104 |
| 2005/0117759 A1 * | 6/2005 | Wu | 381/119 |
| 2005/0157883 A1 * | 7/2005 | Herre et al. | 381/17 |

OTHER PUBLICATIONS

International Search Report; corresponding PCT/US02/21649; dated Jan. 15, 2003; Applicant: Warner Music Group Inc; Inventors: AJ McPherson, GH Lydecker.

* cited by examiner

*Primary Examiner*—Xu Mei
(74) *Attorney, Agent, or Firm*—Gottlieb, Rackman & Reisman (57) ABSTRACT

An apparatus for recording a multichannel program includes an audio converter adapted to convert said multichannel program at least partially into a modified program requiring less channels than said multichannel program. The audio converter including control elements used to modify the conversion process used to generate said modified program. A coefficient generator coupled to said converter to generate a coefficient indicative of the operation of said controls. A mixer is arranged to mix the coefficient with program data. A recorder is arranged to record the mixed data on a medium, whereby the medium can be played either using a multichannel player device or a reduced channel player device by using said coefficient.

8 Claims, 6 Drawing Sheets

APPARATUS AND METHOD FOR DOWN CONVERTING MULTICHANNEL PROGRAMS TO DUAL CHANNEL PROGRAMS USING A SMART COEFFICIENT GENERATOR

BACKGROUND OF THE INVENTION

A. Field of Invention

This invention pertains to a method and apparatus for storing multichannel audio programs such as recordings of DVDs and other similar media. More particularly, the present invention pertains to a method and apparatus for determining coefficients useful for down-converting multichannel recordings to a dual channel (right/left) stereo recording. The coefficients thus obtained are recorded on the respective media together with program and other data as well.

B. Description of the Prior Art

Standard recordings of audio programs, for example for DVD or other modern high quality recording media are normally include up to six or even more channels. The standard six channels are generally termed as left front (LF), right front (RF), left rear (LR), right rear (RR), center (C) and subwoofer (SW). A problem with this type of recording is that in some instances, for example, in a car, or in other environments, such a high quality is not required and a lower quality dual channel stereo reproduction (left and right) is sufficient. Other types of equipment were dual channels may be sufficient include most portable stereos, boom boxes, personal stereos such as the Walkman®, table top radios, and so forth. Multichannel recording can be converted to two channels by the respective playing equipment using, for example, a set of either preset, or arbitrary coefficients. However, this type of conversion is very inaccurate and results in sounds which may not be acceptable to consumers. Moreover, it is the interest of the producer and artist recording a program to insure that the programs are played back as accurately as possible and without unduly compromising the artistic rendition of the respective musical work. If the down conversion takes place using standardized or arbitrary coefficients, the artist and/or producer loses control over the modified program.

In order to insure uniformity and compatibility between various program recording and playback equipment various national and international organizations have promulgated standards for data formatting and other aspects of recording programs on media. Some of these standards include designations for down converting coefficients as well. However, the standards do not specify how the coefficients are to be determined.

OBJECTIVES AND SUMMARY OF THE INVENTION

In view of the above-mentioned disadvantages, it is an objective of the present invention to provide a method and apparatus that can be used to generate a set of down converting coefficient which allow for the conversion of a multichannel program into a dual channel (left/right) program.

A further objective is to provide a device and equipment in which the producer of the program is provided with a system which includes a down converting circuit to allow the producer to select the down converting coefficient while or after he has listened to the converted program to insure that he is satisfied with its quality.

A further objective is to provide a method of generating a multichannel program in the form of digital data wherein the down converting coefficients are imbedded in a conventional form into the program using the appropriate standards.

Other objectives and advantages of the invention shall become apparent from the following description of the invention.

Briefly, the present invention pertains to an apparatus for recording a multichannel program, which apparatus includes an audio converter adapted to convert the multichannel program at least partially into a modified program requiring less channels than the multichannel program. The audio converter includes control elements used to modify the conversion process thereby generating the modified program. A coefficient generator is also provided which is coupled to the converter to generate a coefficient indicative of the operation of the controls. Finally, a mixer is provided to mix the coefficient with program data corresponding to the program and a recorder is provided and arranged to record the mixed data on a medium, whereby the medium can be played either using a multichannel player device or a reduced channel player device by using said coefficient.

In one embodiment of the invention, the audio converter includes a plurality of controls adapted to be activated by an operator. These controls have corresponding positions, and the coefficient generator includes sensors arranged to sense the control positions. The coefficient generator translates these positions into coefficients.

In another embodiment of the invention, the audio converter includes a variable resistor having a resistor position. In this embodiment, the coefficient generator includes a sensor that senses the position of said variable resistor.

The apparatus is arranged so that the audio converter is adapted to convert a multichannel program into a dual program that can be played through a stereo player.

In another aspect of the invention, an apparatus for generating conversion coefficients characteristic of a process for converting a multichannel program into a modified program, the apparatus comprising an audio converter including an input for receiving multichannel signals of a multichannel program and a control circuit adapted to operate on these signals to generate a modified program in accordance with a selectable parameter. A sensor adapted is also provided to determine the parameter and to generate a coefficient corresponding to this parameter. The audio converter is adapted to generate modified signals defining a dual channel program based on the multichannel signals.

The apparatus may be provided with control circuit including a plurality of control elements, each element having a plurality of positions. In this embodiment, the sensor detects said positions and generates coefficients indicative of said positions. the control elements could include a variable resistor which is adjusted by an operator and said sensor is adapted to sense a current value of said variable resistor, the coefficient being dependent on said current value.

The apparatus may include a voltage detector that detects an analog voltage. The sensor then includes an analog-to-digital converter that converts said analog voltage into said coefficient.

Generally speaking, the present application further pertains to a method of generating a data storage medium with a multichannel program comprising the steps of receiving a multichannel program; generating a modified program corresponding to said multichannel program in accordance with a selectable parameter; detecting the selectable parameter; generating a coefficient corresponding to said selectable parameter; combining said coefficient and said multichannel to form combined digital data; and recording said combined digital data on the medium. Generating a modified program includes generating a dual channel program. The step of generating the modified program may include changing the operational parameter until said modified program has certain target characteristics. Generating the modified program may be performed using a circuitry with a control having a variable position, wherein the step of determining the parameter includes determining a current position of the control.

BRIEF DESCRIPTION OF THE DRAWINGS

FIG. 3C shows details of a stage of the control board of FIG. 3B;

DETAILED DESCRIPTION OF THE INVENTION

Figure 1:
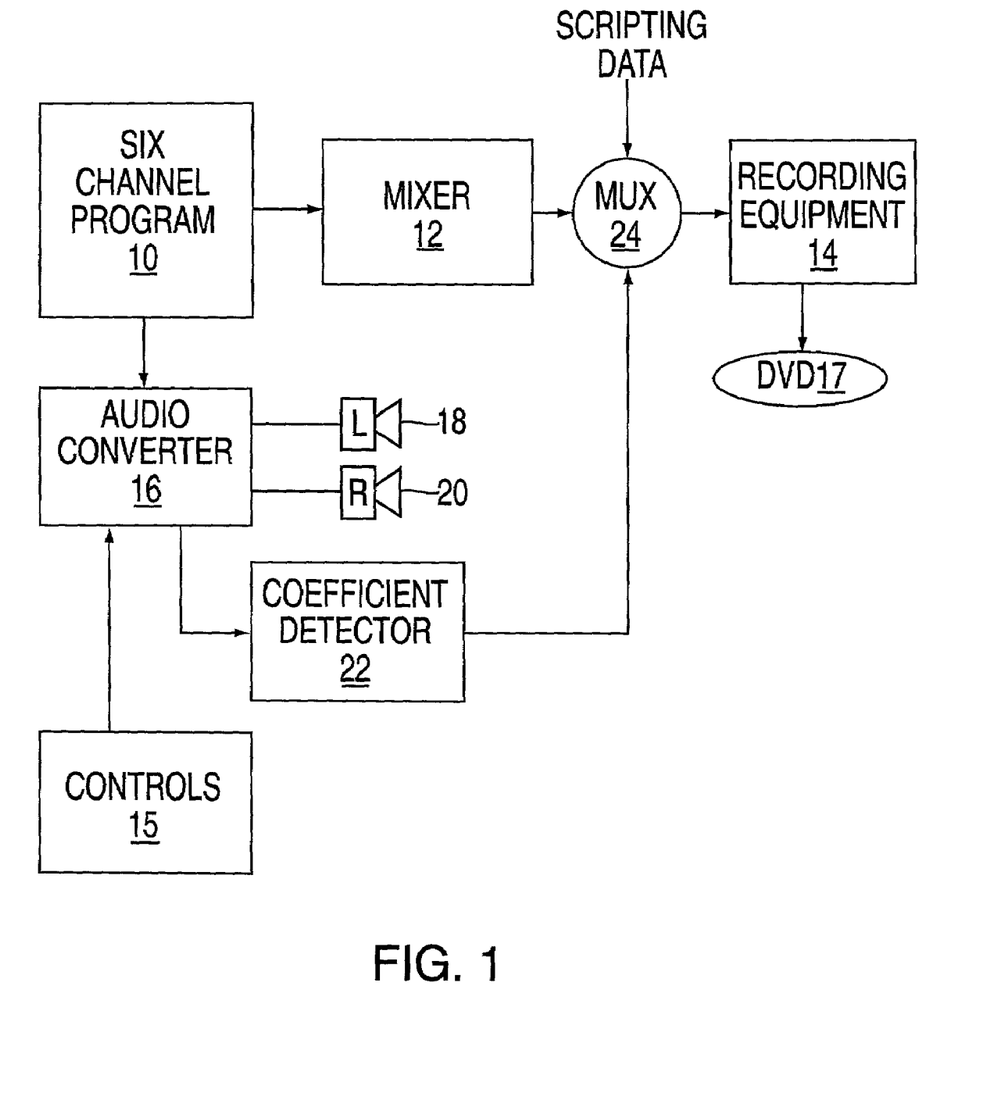
FIG. 1 shows a block diagram for recording a program on a medium in accordance with this invention.

FIG. 1 shows a system 100 for producing a medium with a multichannel program in accordance with this invention. In this system 100, a program consisting of a musical work has been previously recorded and processed, if necessary, and then stored in program storage 10. The storage 10 may be a hard drive, a digital or analog recording media, etc. If the program is stored as analog signals, a suitable conversion is performed on the signals by an analog-to-digital converter (not shown). In order to record this multichannel program on a DVD, the program is first sent to a mixer 12 which combines the six channels using various encoding and error correction schemes into a single data stream. The data stream is combined by mixer 24 with scripting data and then recorded by the recording equipment 14. Scripting data is generated which provides additional information about the musical work, including a table of contents, the name of the composer (s), the orchestra and/or devices used to produce the musical work and so on. The data stream and the scripting data are combined and the recorded on a DVD 17. (In most instances, a large number of DVDs are produced in this manner, however a single DVD is shown for the sake of clarity).

In accordance with this invention, the system 100 further includes an audio converter 16 used to convert the six channel program from program storage 10 into a corresponding dual channel program. The converter includes a set of controls 15 that generate parameters required for the conversion. These controls may be set and modified during the conversion by an operator, such as the producer, composer or sound engineer. The converter 16 may initially use a set of preselected set of coefficients. As the multichannel program is converted into a dual channel program and played on speakers 18, 20, the operator can continue to adjust the coefficients using controls 15 until a set of satisfactory coefficients are obtained.

The coefficients selected by the operator are detected by coefficient detector 22 which monitors the controls 15. The coefficients are then mixed with the data from mixer 12 using a multiplexer 24 so that the recording equipment 14 stores the six channel data stream, the scripting data and the coefficients on the DVD 17.

Figure 2:
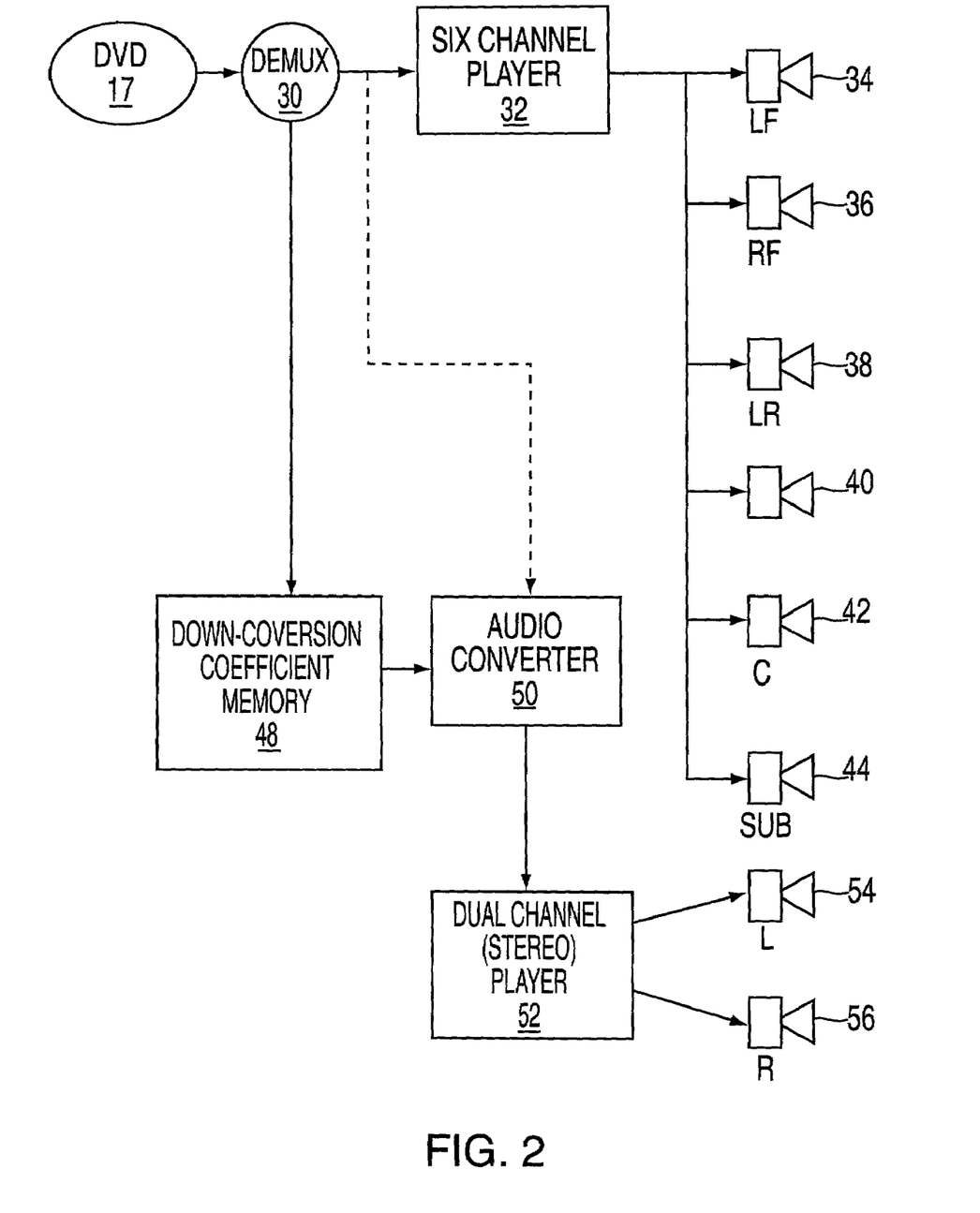
FIG. 2 shows a block diagram of a device adapted to play a program from a medium as a multichannel or dual channel program.

FIG. 2 shows somewhat diagrammatically a playback device 110. This device can play the six channel program on DVD 17 either as a six channel or can convert it to a dual-channel program. A dual mode device is shown here merely to illustrate how a multichannel program can be processed. Of course DVD players can be constructed to play either only six- or only dual channel programs, as discussed below.

The data from the DVD 17 is first fed to a demultiplexer 30 which normally separates the program data and the scripting data. The scripting data is sent to a screen. The program data is sent to a six channel player 32. The six-channel player then plays the program on six speakers 34, 36, 38, 40, 42, 44.

Optionally, the demultiplexer 30 may also strip from the data stream on DVD 17 the conversion coefficients. These coefficients may be stored in a coefficient memory 48. Moreover, in this latter case the program data is sent to an audio converter 50. The audio converter 50 converts the six-channel program into a dual channel program using the coefficients from memory 48. The dual channel program is sent to a dual channel player 52 which then plays the program on speakers 54 and 56.

The playback device 110 is shown in a configuration which allows the device to play a six-channel program as either six- or a dual-channel program. Of course similar devices may be constructed to play a six-channel program only on a six channel player, or to always convert the six-channel program into a dual channel program.

Figure 3A:
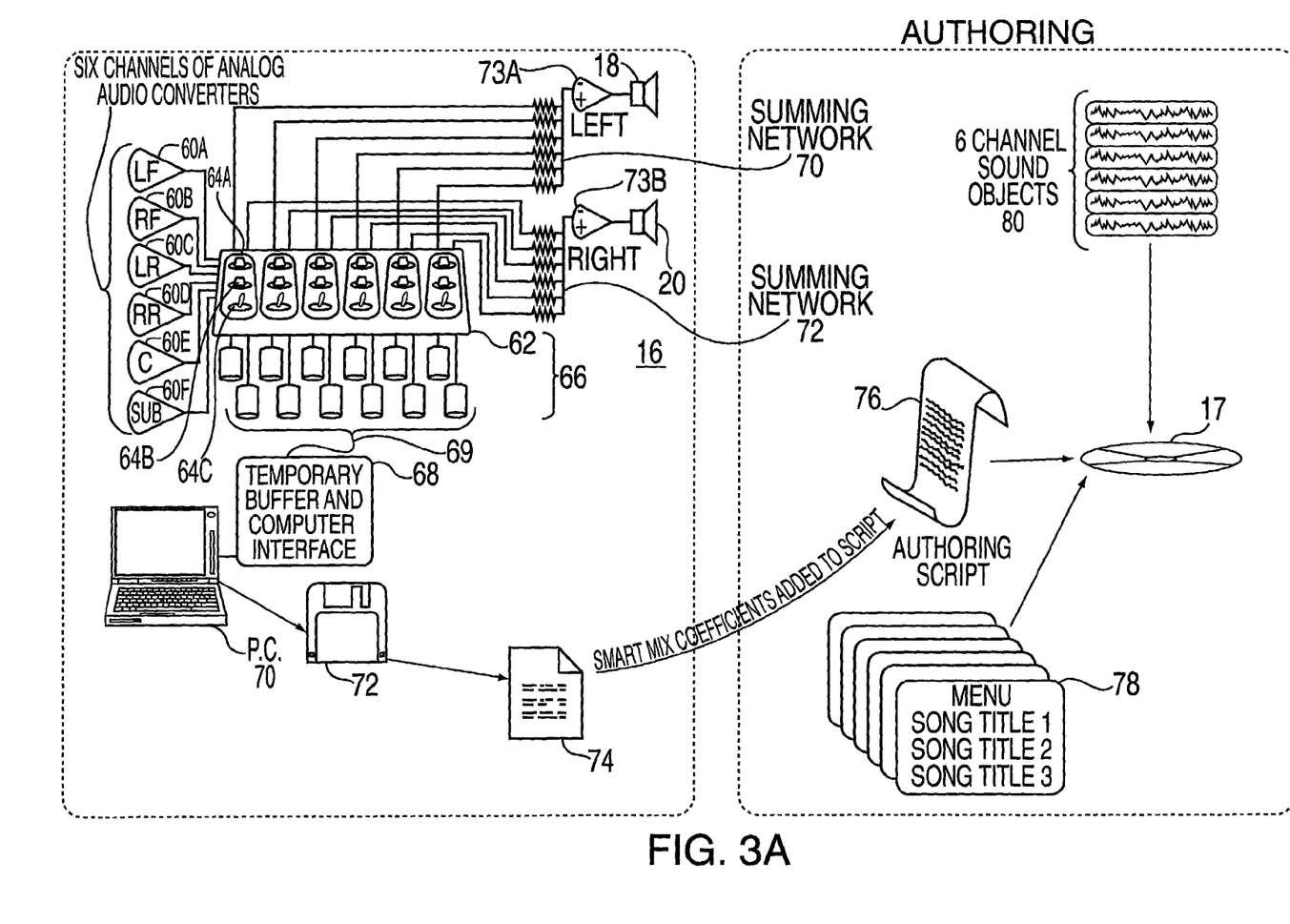
FIG. 3A shows a block diagram with details of the audio program and the scripting process.

FIG. 3A shows a block diagram of the audio converter and the scripting operation in a somewhat diagrammatic form. On this Figure, the audio converter 16 receives six channel signals, each channel signal having been separated by a demultiplexer (not shown) from the six-channel program and fed to one of the corresponding six inputs 60A-F. The six channel signals are the standard analog signals and are designated as LF, RF, LR, RR, C and SUB. If the program storage 10 stores digital programs then each program has to be converted into six analog signals.

The six channel signals are fed to a control panel 62 holding 18 controls, a set of three controls being dedicated to each channel signal. The three controls are the PAN (64A), LEVEL (64B) and PHASE (64C) controls. The PAN and LEVEL controls 64A and 64B, can be used to attenuate a respective input continuously. The third control 64C is a two-position switch and is used to control the phase. The position of each of these controls defines a corresponding conversion coefficient.

In accordance with this invention, the position of each of the controllers are sensed by a plurality of position sensors 66. The sensed coefficients from sensors 66 are stored in a temporary buffer 68 and transmitted to a PC when required. The PC stores the coefficients on a floppy disk 70.

Each of the six channel signals are modified by the controls 64A, 64B, 64C resulting in a set of twelve signals. These twelve signals are partitioned into a right and a left group and fed to respective summing networks 70, 72. The summing networks sum add the signals of each group and feed them to respective speakers 18 and 20 as shown. The producer of DVD 17 or a sound engineer or composer listens to all, or at least part of the program as it is rendered into a 2-channel version by the circuitry of FIG. 3A and adjusts the coefficients accordingly by manipulating one of the controls 64A, 64B and 64C.

Thus, during the recording a six-channel program, three sets of digital data are obtained: a set of six digital sound objects 80, one set of coefficients for each of the six channels 74; and one set of graphical elements 78. An authoring tool well known in the art is used to generate an authoring script 76 from the set of coefficients. The three sets of data are then combined and recorded by recording equipment 14 on DVD 17.

Figure 3B:
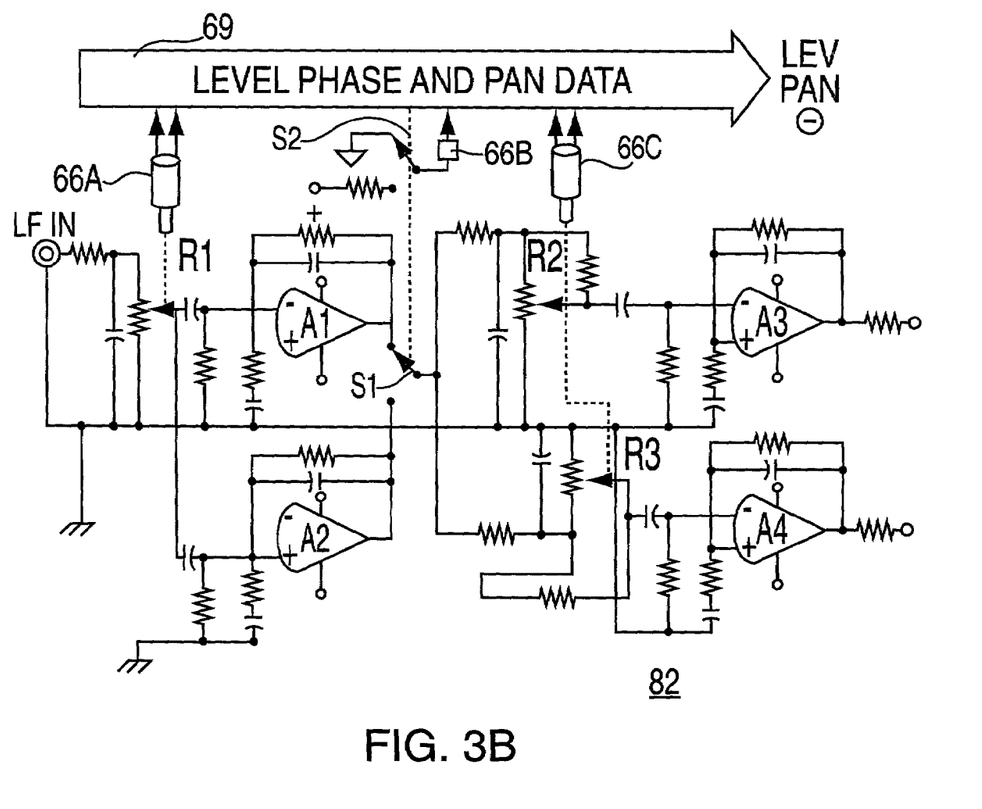
FIG. 3B shows a block diagram of the control board for the audio controller of FIGS. 1, 2 and 3A.

As shown in FIG. 3B the control board 62 as consisting of six stages 82A-F which generate the eighteen coefficients. FIG. 3C shows details of stage 82A, the remaining stages being similar. As can be seen in FIG. 3C, stage 82A includes three variable resistors R1, R2, R3, a pair of ganged switches S1, S2 and four amplifiers A1-A4. Resistors R2 and R3 are ganged as well.

The stage 82A operates as follows. The input channel signal, in this case LF, is attenuated by resistor R1 and then fed in parallel to amplifiers A1 and A2. The two amplifiers A1 and A2 are arranged so that they deliver similar outputs but with reversed phase. Switch S1 is used to select the output of either amplifier A1 or amplifier A2. The signal selected by switch S1 is attenuated and fed in parallel to resistors R2 and R3. The output of resistors R2 and R3 are fed to respective amplifiers A3 and A4 which generate two identical outputs with opposite phases.

Going back to FIG. 3A, the outputs of amplifiers A3 and A4 from all six stages are fed respectively to two summing networks 70 and 72. The outputs of these networks are amplified by two amplifiers 73A and 73B and then fed to respective speakers 18 and 20.

The three coefficients generated by each stage shown in FIGS. 3B and 3C are the level data Lev0, related to the position of resistor R1, the phase data Ph0 related to the position of switch S1, and the pan data Pan0 related to the positions of resistors R2 and R3.

As shown in FIG. 3C, each stage includes two sensors 66A, 66B and switch S2. Sensor 66A is used to detect the position of resistor R1. Sensor 66B is used to sense the position of resistors R2/R3 (it should be remembered that since these two switches are ganged, one encoder for both resistors is sufficient. Switch S2 is ganged with switch S1 and is arranged so that its output is either low or high. The outputs of sensors 66A, 66B and switch S2 are fed to a common data bus 69, which then provides the respective coefficients to buffer 68.

Sensors 66 can be implemented in a number of ways. For example, if the resistors R1, R2 and R3 have shafts, then the sensors can be implemented using shaft encoders. More specifically, referring to FIG. 4A, resistor R1 is shown as a variable resistor with a shaft X1. Mounted on shaft X1 is a shaft encoder SE1 which senses the position of the shaft X1 and generates digital data corresponding to this position.

Figure 4A:
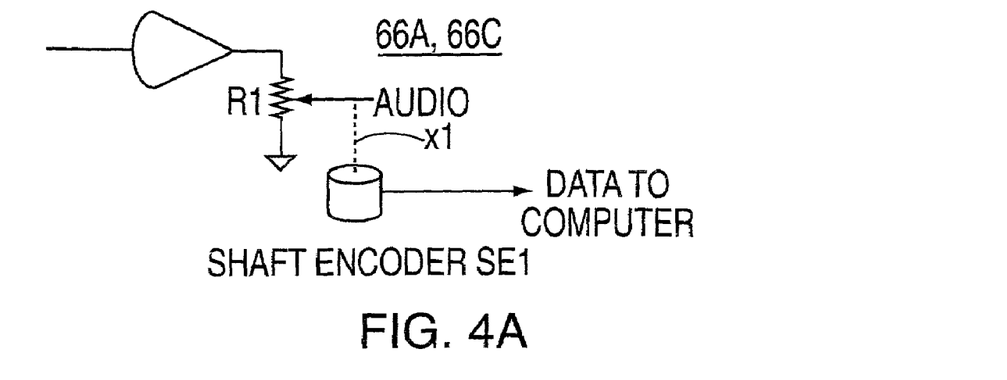
FIG. 4A shows a first implementation of a coefficient sensor.

The level coefficient from sensor 66A, Lev0 is related to the data obtained from the encoder SE1. This level may between the values 0 and M where M is a predetermined value expressed in bits. Typically the value M for the coefficient Lev0 corresponds to a voltage gain of about 2 or a dB gain of about 6 dB.

The coefficient pan from sensor 66B may vary from 0 to N. The transfer function for the pan data for the stage of FIG. 3A is given by:

$$LF(dB)=20 \, [\ln(\cos C^*D)/\ln 10]$$

where C is a constant to convert the shaft position into corresponding angular measurements in degrees or radians and D is the coefficient Pan0 from the sensor 66B.

For the right front stage the transfer function is:

$$RF(dB)=20 \, [\ln(\sin C^*D)/\ln 10]$$

Figure 5:
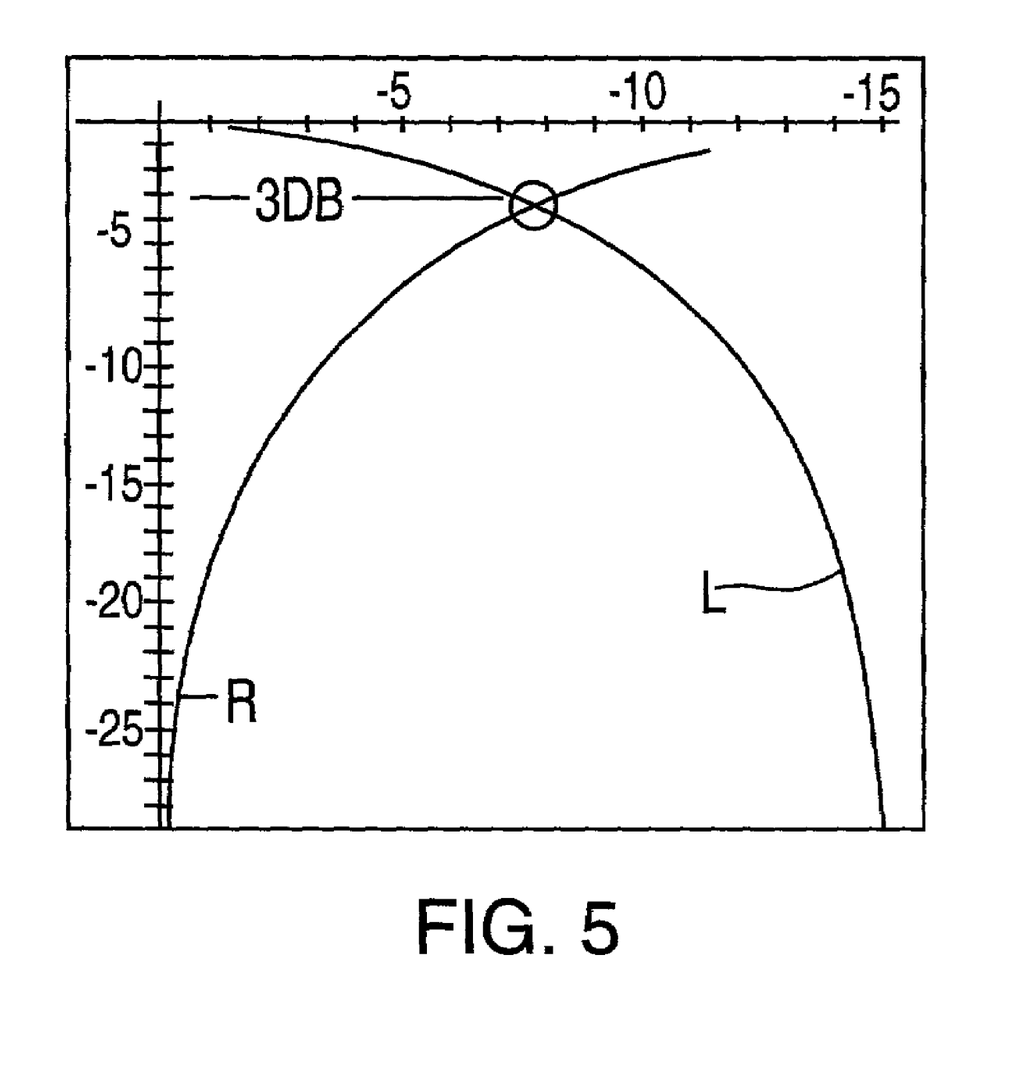
FIG. 5 shows the relationship between some of the coefficients and the resulting dual program generated by the audio converter of FIGS. 1 and 3A.

FIG. 5 shows a graph of Leftin and Rightin as a function of the respective Pan coefficients.

Figure 4B:
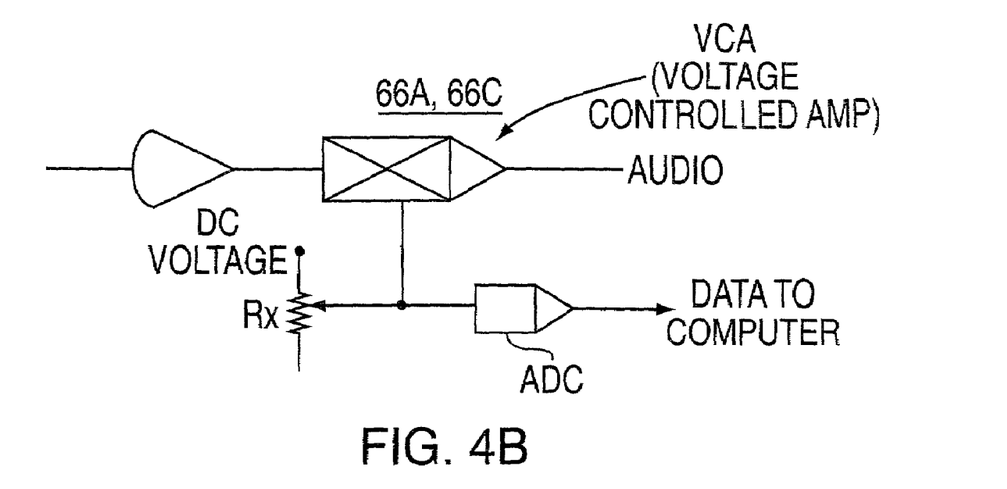
FIG. 4B shows a second implementation for a coefficient sensor.

Another way of implementing sensors 66 is shown in FIG. 4B. In this Figure, the resistor R1 is displaced by a voltage controlled amplifier VCA a variable resistor Rx and a digital-analog converter DAC. In this configuration the gain of amplifier VCA is controlled by the resistor Rx between a value of zero or ground and the DC voltage by generating a control voltage VC. The control voltage VC is fed to both the amplifier VCA and the ADC. The ADC then converts the voltage VC to corresponding digital data D.

Figure 4C:
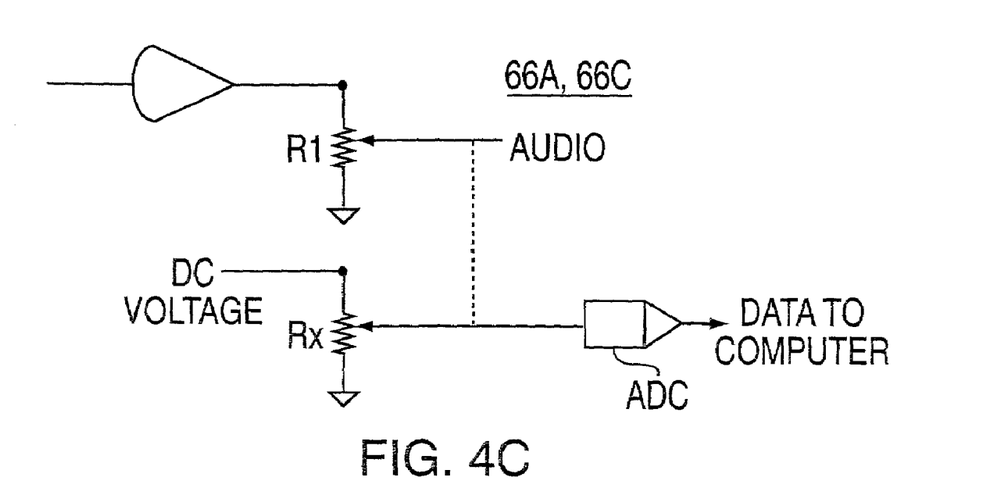
FIG. 4C shows a third implementation of a coefficient sensor.

A third implementation is shown in FIG. 4C. In this implementation, a variable resistor Rx is ganged to resistor R1 and connected between DC voltage and ground. The voltage from resistor Rx is then fed to a digital converter ADC to generate data D.

Obviously numerous modifications may be made to this invention without departing from its scope as amended herein.

We claim:

1. An apparatus for recording a multichannel program comprising:
   an audio converter adapted to use a conversion process to convert said multichannel program at least partially into a modified program requiring less channels than said multichannel program, said audio converter including control elements used to modify the conversion process;
   a coefficient generator coupled to said audio converter to generate a coefficient indicative of the operation of said control elements;
   a mixer arranged to mix said coefficient with program data corresponding to said modified program to generate mixed data; and
   a recorder arranged to record the mixed data on a medium, wherein said medium is played using a reduced channel player device to reproduce said multichannel program, said reduced channel player making use of said coefficient.

2. The apparatus of claim 1 wherein said audio converter is adapted to convert a multichannel program into a dual program that is played through a stereo player.

3. A method of generating a data storage medium with a multichannel program comprising the steps of:
   receiving a multichannel program;
   generating a modified program corresponding to said multichannel program in accordance with a selectable parameter using a conversion process;
   detecting a coefficient corresponding to said selectable parameter, said coefficient being descriptive of said conversion process;
   combining said coefficient and said multichannel program to form combined digital data; and
   recording said combined digital data on the medium.

4. The method of claim 3 wherein said step of generating a modified program includes generating a dual channel program.

5. The method of claim 3 wherein said step of generating said modified program includes changing said selectable parameter until said modified program has preselected target characteristics.

6. The method of claim 3 wherein said coefficient is indicative of a PAN control.

7. The method of claim 3 wherein said coefficient is indicative of a PHASE control.

8. The method of claim 3 wherein said coefficient is indicative of a LEVEL control.

* * * * *